Patented Oct. 30, 1951

2,573,264

UNITED STATES PATENT OFFICE 2,573,264

FURNACE BRICK

Frank O. Keltz, Latrobe, Pa., assignor to McFeely Brick Company, Latrobe, Pa., a corporation of Pennsylvania No Drawing. Application March 12, 1949,
Serial No. 81,207

5 Claims. (Cl. 106—63)

This invention refers to the manufacturing of silica refractories, such as are used in the constructing of metallurgical furnaces, soaking pits, coke ovens, electrical furnaces, open hearth furnaces and other types of industrial furnaces.

Research by manufacturers of refractories and steel mill ceramists, has shown that silica bricks of increased refractoriness will be produced if the alumina content is not over 1%, than if the alumina content ($Al_2O_3$) is substantially in excess of 1% heretofore thought to be desirable for high quality silica brick.

Silica bricks have commonly been made of ganister and siliceous gravel or sand with which there is usually associated a substantial percentage of $Al_2O_3$, there being also earthy matter included in the siliceous material.

My invention has for its object the provision of a silica brick or the like wherein there is the desired low percentage of $Al_2O_3$, but without a substantial quantity of alkalies, the bricks having good mechanical strength to avoid breakage through handling and after firing, and being highly resistant to erosion and spalling and to heat shock.

In the practice of my invention, I select ganister and gravel that do not have appreciable quantities of alumina, alkalies, or iron, for the purpose of obtaining highly refractory bricks. Such bricks possess the desired refractoriness, but are physically weak. To overcome this fault, I have found it advantageous to add fused alumina comparatively free of deleterious alkalies, to the batch, thereby increasing the strength of the brick. Such bricks may contain a total of 1.00% $Al_2O_3$.

At any rate, approximately pure ganister and siliceous gravel, or siliceous gravel alone, will be ground to desired grain sizes mixed with lime and with fused alumina fines, and sufficient water for the shaping of bricks which will be dried and fired in the usual manner. The ganister can be either raw or calcined, or a mixture of both. Some mixtures suitable for the practice of my invention are as follows:

Example 1

| | Pounds |
|---|---|
| Ganister raw | 100 |
| Ganister calcined | 100 |
| Siliceous gravel | 1000 |
| Lime | 30 |
| Fused alumina fines | 2 |

Example 2

| | Pounds |
|---|---|
| Ganister raw | 200 |
| Ganister calcined | 200 |
| Siliceous gravel | 800 |
| Lime | 30 |
| Fused alumina fines | 2 |

Example 3

| | Pounds |
|---|---|
| Siliceous gravel | 1200 |
| Lime | 30 |
| Fused alumina fines | 2 |

The siliceous material (ganister and gravel) is in graded sizes and will all pass through a No. 4 screen.

.4% to 3.5% will pass through a No. 6 screen.
13.2% to 22.2% will pass through a No. 12 screen.
18.3% to 22.0% will pass through a No. 20 screen.
7.5% to 8.5% will pass through a No. 30 screen.
6.0% to 6.6% will pass through a No. 40 screen.
6.2% to 6.8% will pass through a No. 50 screen.
7.9% to 8.4% will pass through a No. 80 screen.
2.2% to 2.8% will pass through a No. 100 screen.
Balance will pass through a 200 mesh screen.

The fused alumina may be in the form of either powder or small grains.

Stated percentagewise, the mixture may be as follows:

Example 4

| | Per cent by weight |
|---|---|
| Ganister either raw or calcined | 16 to 33 |
| Siliceous gravel | 65 to 81 |
| Lime | 2 to 3 |
| Fused alumina fines | .10 to .30 |

Example 5

| | Per cent by weight |
|---|---|
| Siliceous material | 97 |
| Lime | 2 to 2.85 |
| Fused alumina fines | .10 to .30 |

In the examples given, there will be alumina present in the ganister and siliceous gravel, to the extent of perhaps .70%, even where these siliceous materials are selected for their purity, or freedom from excessive alumina and the accompanying alkalies.

As stated above, the siliceous materials are substantially free of alkalies and iron. When ganister is used, it may have more alumina than may be found in siliceous gravel, and this alumina in the ganister is taken into consideration when adding the fused alumina.

The lime acts as a bonding agent for the material while the bricks are being dried and fired. After drying, the bricks are fired by gradually heating them to a maximum of 2650° F. to 2750° F. in seven or eight days and held at high temperatures for two or three additional days. This firing developes a permanent bond which will sustain the bricks during handling and subsequent industrial use.

The amount of fluid glass formed in silica refractories depends upon the amount of alumina, iron and alkalies present. As erosion takes place at elevated operating temperatures, it is advantageous to have a minimum of glass in the product. As the alkalies are low melting elements, it follows that the eutectic melting point is influenced greatly by their presence and materials should be selected with this in mind. Therefore, I have eliminated some naturally-occurring alumina, with the accompanying iron and alkalies, by selection and preparation of the raw materials and have found that by adding 0.10% to 0.30% of fused alumina powder or any high alumina material free of deleterious alkalies, I obtain a brick that can have considerably less than 1% alumina content and yet have the strength of a conventional silica brick which contains 1.25% to 2.00% $Al_2O_3$.

I claim as my invention:

1. A silica brick formed of high silica material substantially free of alkalies and iron, and also containing lime and fused alumina, the lime being approximately 2% (by weight) of the mixture, and the total alumina content, including .10% to .30% of the fused alumina, being not in excess of 1% of the mixture, by weight.

2. A silica brick formed of high silica material in the form of ganister and grains that are substantially free of alkalies and iron, and also containing lime and fused alumina, the lime being approximately 2% (by weight) of the mixture, and the total alumina content, including .10% to .30% of the fused alumina, being not in excess of 1% of the mixture, by weight.

3. A silica brick comprising:

| | Per cent by weight |
|---|---|
| High silica material substantially free of alkalies and iron | 96 to 97 |
| Lime | 2 to 3 |
| Fused alumina | .10 to .30 |

4. A silica brick comprising:

| | Per cent by weight |
|---|---|
| Ganister | 16 to 33 |
| Siliceous gravel | 65 to 81 |
| Lime | 2 to 2.85 |
| Fused alumina | .10 to .30 | the ganister and gravel being substantially free of alkalies and iron and being of high silica material.

5. A silica brick comprising:

| | Per cent by weight |
|---|---|
| Ganister (raw) | 8 |
| Ganister (calcined) | 8 |
| Siliceous gravel | 81 |
| Lime | 2 to —3 |
| Fused alumina | .16 to .30 | the ganister and gravel being substantially free of alkalies and iron and being of high silica material.

FRANK O. KELTZ.

REFERENCES CITED

The following references are of record in the file of this patent:

UNITED STATES PATENTS

| Number | Name | Date |
|---|---|---|
| 1,244,275 | Zell | Oct. 23, 1917 |
| 1,969,751 | Heuer | Aug. 14, 1934 |
| 2,351,204 | Harvey et al. | June 13, 1944 |

FOREIGN PATENTS

| Number | Country | Date |
|---|---|---|
| 840 | Great Britain | 1881 |
| 591,243 | Great Britain | 1947 |